US008554397B1

(12) United States Patent
Nishinaga et al.

(10) Patent No.: US 8,554,397 B1
(45) Date of Patent: Oct. 8, 2013

(54) METHOD OF PREVENTING COLLISIONS BY REACTING TO CONTROL SYSTEM FAILURES

(75) Inventors: Eugene Iwao Nishinaga, San Rafael, CA (US); Kevin Kohei Nishinaga, San Rafael, CA (US)

(73) Assignee: Cybertran International Inc., Richmond, CA (US)

( * ) Notice: Subject to any disclaimer, the term of this patent is extended or adjusted under 35 U.S.C. 154(b) by 0 days.

(21) Appl. No.: 13/218,434

(22) Filed: Aug. 25, 2011

Related U.S. Application Data

(60) Provisional application No. 61/459,247, filed on Dec. 10, 2010.

(51) Int. Cl.

| | |
|---|---|
| ***G05D 3/00*** | (2006.01) |
| ***G05D 1/00*** | (2006.01) |
| ***G06F 7/70*** | (2006.01) |
| ***G06F 17/00*** | (2006.01) |

(52) U.S. Cl.
USPC .................. 701/19; 701/20; 701/96; 701/23; 701/301; 340/435

(58) Field of Classification Search
USPC ................. 701/19, 23, 1, 24, 301, 20; 104/96
See application file for complete search history.

(56) References Cited

U.S. PATENT DOCUMENTS

| | | | | |
|---|---|---|---|---|
| 7,302,319 | B2 * | 11/2007 | Wu | 701/19 |
| 7,561,948 | B2 * | 7/2009 | Gaegauf et al. | 701/19 |
| 8,090,489 | B2 * | 1/2012 | Delean | 701/24 |
| 8,195,342 | B2 * | 6/2012 | Anderson | 701/1 |
| 8,195,358 | B2 * | 6/2012 | Anderson | 701/30.3 |
| 8,200,428 | B2 * | 6/2012 | Anderson | 701/453 |
| 8,224,500 | B2 * | 7/2012 | Anderson | 701/1 |
| 8,229,618 | B2 * | 7/2012 | Tolstedt et al. | 701/23 |
| 2008/0015745 | A1 | 1/2008 | Gaegauf et al. | |
| 2008/0154452 | A1 | 6/2008 | Kapp et al. | |
| 2008/0167767 | A1 | 7/2008 | Brooks et al. | |
| 2010/0114407 | A1 | 5/2010 | Klooster et al. | |
| 2010/0318247 | A1 | 12/2010 | Kumar | |
| 2010/0319565 | A1 | 12/2010 | Mobasher | |

OTHER PUBLICATIONS

Nishinaga, et al., "A Vehicle Collision Avoidance System Using Time Multiplexed Hexadecimal FSK", Boeing Aerospace Company, IEEE/Vehicular Technology Conference, vol. 33, 1983, pp. 171-182.
Burt, H.G.P., et al., "Microprocessor Control of Wheel Slip," IEEE, pp. 19-28.

* cited by examiner

*Primary Examiner* — Thomas Black
*Assistant Examiner* — Robert Payne
(74) *Attorney, Agent, or Firm* — Pillsbury Winthrop Shaw Pittman LLP

(57) ABSTRACT

The present invention relates generally to ground transportation systems, and more particularly to a fixed guideway transportation system that achieves a superior ratio of benefits per cost, is lower in net present cost and thus more easily justified for lower density corridors, and can provide passenger carrying capacities appropriate for higher density corridors serviced by mass rapid transit systems today. According to certain aspects, the present invention provides a methodology for limiting the rise in headway as the vehicle speed increases. This innovation further allows systems to achieve shorter time separations between vehicles traveling at high speeds, thus significantly improving the utility of fixed guideway infrastructure.

21 Claims, 14 Drawing Sheets

TWO VEHICLES PASSING DIVERGE POINT

METHOD OF PREVENTING COLLISIONS BY REACTING TO CONTROL SYSTEM FAILURES

CROSS-REFERENCE TO RELATED APPLICATIONS

The present application claims priority to U.S. Provisional Application No. 61/459,247, filed Dec. 10, 2010, the contents of which are incorporated herein by reference in their entirety.

FIELD OF THE INVENTION

The present invention relates to ground transportation, and more particularly to fixed guideway transportation systems having an optimal ratio of benefits per cost and a method for designing the same.

BACKGROUND OF THE INVENTION

Modern mass rapid transit rail systems are very effective carriers of people. They are generally grade separated systems to enable vehicles to operate unaffected by automobile traffic, and thereby are able to achieve traffic densities otherwise unachievable. They are, however, very expensive. A typical, but conservative order of magnitude system capital cost for a system is approximately $100 million per bi-directional track mile of system, making it difficult for communities and cities to justify and/or afford the cost of new construction. This limitation has the effect of constraining the reach of these systems, and thus limiting the convenience to the users who can only ride the systems to the few locations to which guideway has been constructed. This results in a classic case of Catch 22. The high cost of systems requires a high ridership to justify the cost. However, high guideway costs limit construction and thus the reach of fixed guideway systems. This limits convenience to the riders, making it difficult to achieve the high ridership needed to justify the high cost.

Conventional mass rapid transit rail technology attempts to improve the ratio of benefits per cost by focusing on serving the commuting public. This means building systems to achieve very high passenger capacities to major employment centers. An example conventional system is shown in FIG. 1. As shown, conventional systems 110 achieve high capacities by building heavy infrastructure and operating long heavy trains 112 that typically carry a large number of riders to the few large employment centers 114, 116 that they can most effectively service, while bypassing smaller towns or communities 118, 120. This, however, requires very costly guideway 122 and station structures 124, 126, which limits the system's reach and thus convenience for the users, especially for those who want to travel to the generally more widely distributed retail, residential, or recreational destinations.

With guideway 122 and station structures 124, 126 that must be built to handle long heavy trains 112 to support demand during commute hours, the result is an expensive but marginally justifiable solution for commute hour travel which is far too expensive to justify for other periods of the day and other destinations.

Other existing transportation systems that aim to be less expensive to build and operate include automated people mover (APM) systems, such as those operating in many modern airports and some cities. These systems are low speed/low capacity systems that operate driverless vehicles at speeds in the range of 25 to 30 mph and achieve line capacities in the range of 2,000 to 3,000 passengers per hour per direction. Given the limited speed and capacity of these systems, even with the somewhat lower cost of construction due to the use of smaller vehicles, the benefit per cost is still poor. Furthermore, with the lower speeds and line capacities, these systems are limited in utility to local service routes.

Another type of transportation system that has been discussed is called "personal rapid transit" (PRT). PRT's differ from the more common APM systems in that these systems are built with offline stations which allow higher traffic densities to be achieved. Typically these systems operate driverless cars that seat four to six people and can provide service on a personal demand-driven basis. However, with the very small cars, high speeds are difficult to achieve and line capacities are severely restricted. Certain existing systems purport to be PRT systems, including a line at Heathrow Airport in London and one in the Masdar City district of Abu Dhabi, although with top speeds in the range of 25 mph, these systems cannot be truly considered "rapid transit."

In both of the transportation modes described above, the low line capacities that can be achieved make the economic benefits to cost ratio poor. Because any fixed guideway technology requires expensive track infrastructure to be constructed even with smaller lighter cars, unless the service capacity can be made high, the cost of construction per passenger served is high, making it difficult to cost justify.

Co-pending application Ser. No. 13/218,422, the contents of which are incorporated by reference in their entirety, dramatically advanced the state of the art by providing a fixed guideway transportation system that can overcome many of the above and other challenges of the prior art. For example, the system of the co-pending application includes driverless vehicles carrying 10 to 30 persons that can achieve a line capacity that is equivalent to that which is achieved with the current day mass transit systems that achieve capacity with long and heavy trains. With a holistic understanding of the issues that drive the cost of transit, the invention of the co-pending application is designed to optimize the amount of benefits per cost of such systems. However, certain challenges remain.

For example, in order to cost effectively build and operate a system that operates smaller vehicles such as those contemplated by the co-pending application, yet achieves line capacities that justify the cost of constructing track infrastructures, the density of traffic that can be achieved should be sufficiently high. That means that the safe operating headways must be made smaller than that which is achievable with conventional control systems that represent today's state of the art. Furthermore, these safe operating headways should be achieved at mass rapid transit speeds (at least 60 mph). Quantifying the relationship between the achievable safe operating headway and the derived benefits and costs that result from the performance achieved, is a complex problem. It requires as inputs to the calculation, an understanding of how capital construction costs are affected by the weight of the vehicle, and how the cost of operating and maintaining a system is driven by vehicle weight and count. For simplicity, if the goal is that the ratio of benefits per cost must be improved by a factor of 4, this improvement could be achieved by operating 40 passenger vehicle consists (this could be 40 passenger vehicles, or smaller vehicles operated in a consist of multiple vehicles) with a safe operating headway of 9 seconds. However, this short headway cannot be achieved with current systems. Accordingly, there remains a need for a methodology for designing a system that provides the collision protection necessary to operate at a 9 second separation at these high traffic densities.

Relatedly, since a collision between two vehicles is a life-threatening event, control functions that prevent collisions are critical to safety. In the rail industry, control that is critical to safety must be designed and implemented to a standard commonly referred to as "vital." In recent years achieving vital status has required an analytical demonstration of a Mean Time Between Unsafe Event or Hazard (MTBH) of $10^9$ hours or greater. Accordingly, any methodology aimed at increasing traffic density should include collision protection satisfying this standard.

SUMMARY OF THE INVENTION

The present invention relates generally to ground transportation systems, and more particularly to a fixed guideway transportation system that achieves a superior ratio of benefits per cost, is lower in net present cost and thus more easily justified for lower density corridors, and can provide passenger carrying capacities appropriate for higher density corridors serviced by mass rapid transit systems today. According to certain aspects, the present invention provides a methodology for limiting the rise in headway as the vehicle speed increases. This innovation further allows systems to achieve shorter time separations between vehicles traveling at high speeds, thus significantly improving the utility of fixed guideway infrastructure.

In accordance with these and other aspects, a method of controlling a plurality of driverless vehicles in a fixed guideway system according to the invention includes periodically determining whether there are any safety violations in the system, the determination taking into account a controlled braking rate of one or more of the vehicles; and withholding transmission of a safety signal to certain of the vehicles if there is a violation.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

Figure 1:
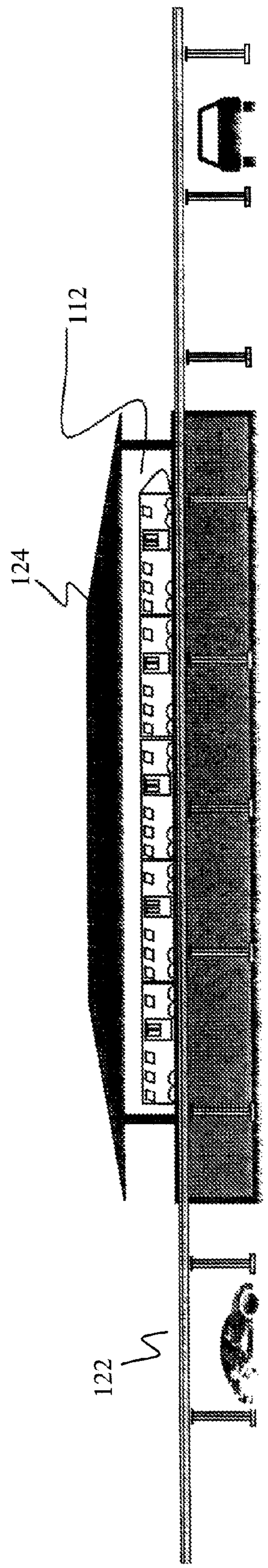
FIGURE 1 (PRIOR ART)
FIG. 1 illustrates a conventional mass transit system.

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

According to certain aspects, the invention of the co-pending application enables the construction of rail lines that: 1. achieve a superior amount of benefits per cost; 2. are lower in cost and thus more easily justified for lower density corridors; and 3. can provide passenger carrying capacities appropriate for higher density corridors serviced by mass rapid transit systems today.

In certain embodiments, these objectives are met by utilizing smaller vehicles that can operate on a less expensive infrastructure. Using certain methods according to the co-pending application, the costs of fixed guideway mass rapid transit systems are reduced, allowing more destinations to be accessed. Also, with certain methods according to the co-pending application, the same structures appropriate for low ridership corridors and/or service hours can be used to achieve passenger carrying capacities needed for the high capacity corridors served today by modern mass rapid transit systems.

According to further aspects, the invention of the co-pending application improves the ratio of benefits per cost of rail transit by reducing the cost to levels more justifiable for low density corridors. To be meaningful, certain methods according to the co-pending application achieve improved benefits per cost in a holistic manner, in other words, by reducing the net cost of ownership which includes not only the cost of equipment but also the net cost of operating and maintaining the system.

Although the principles of the inventions of the co-pending application and the present application will be explained in connection with applications to conventional diesel and/or electrified rail systems, the invention is not limited to these types of systems. For example, the principles of the invention can be extended to conventional and other vehicle technologies that do not rely on steel wheels rolling on steel rail. Examples of such include systems that use vehicles that operate with rubber tires on pavement (or otherwise without rails), vehicles that operate with non-steel wheels on rails, vehicles that utilize magnetic levitation and/or propulsion, and vehicles that utilize pneumatic levitation and/or propulsion.

According to certain aspects, the present inventors recognize that increasing traffic density, such as that contemplated in the system according to the co-pending application (i.e. 9 second separation between vehicles), cannot be achieved with conventional collision avoidance and vehicle control methodologies.

A novel vehicle control methodology that can be used in a system according to the co-pending application, as well as with the present invention, is described in U.S. application Ser. No. 13/323,768, the contents of which are incorporated herein by reference in their entirety.

Accordingly, the present application is directed to novel collision avoidance methodologies for use in a fixed guideway transportation system such as that described in the co-pending application, and which improves traffic density. For example, the present inventors recognize that the traffic density that is achievable with conventional vehicle control systems is limited by what is commonly referred to as the "brick wall criteria," a control rule that mandates that a vehicle following another vehicle must follow at a distance such that collisions are avoided even if the location of the tail end of the leading car were a brick wall on the track. This, coupled with the low levels of adhesion and therefore low deceleration rates (typically −1.5 mphps to −2.5 mphps) that can be guaranteed with steel wheels and steel rail, prevents vehicles from operating at time separations (headways) that achieve service capacities that can justify the high cost of building track infrastructure.

Certain aspects of an overall collision avoidance system in which the present can be implemented are described in U.S. application Ser. No. 13/218,429, the contents of which are incorporated herein by reference.

In general, an aspect of the present invention is that collision avoidance (i.e. collision prevention) is implemented with a dual state response system events that require action to be taken to ensure safety. Referred hereafter in this disclosure as Collision Avoidance System 1 (CAS 1) and Collision Avoidance System 2 (CAS 2), the two systems take effect in different ways and for different situations. CAS 1 takes effect when vehicle dynamic control functions fail and allow or cause two vehicles to operate too close together. CAS 2 on the other hand, is implemented to protect against externally created hazards such as trees falling on tracks or rail breakage that results in a non-control-related extreme deceleration of the lead car.

The present inventors recognize that a case for safety can be made on the basis that events that require the protection provided by CAS 1, will occur with a probability of occurrence equal to 1. In other words, 1) that there will be errors in the design of the controller that will go unnoticed and thus uncorrected and 2) that there will be hardware failures that can defeat the movement control functions. Events that require CAS 2, however, are external events for which a non-unity probability of occurrence can be assumed. It should be noted that such events should be extremely rare, perhaps so rare that the claim can be made that they will never occur in a real-life application. In such case, CAS 2 may not be required.

The present application describes example implementations of a methodology that can provide the collision avoidance functionality of CAS 1.

As set forth in U.S. application Ser. No. 13/218,429, and according to an aspect of the present invention, a collision prevention or avoidance methodology preferably monitors the system state at all times to confirm that a safety condition that could result in a collision is never violated. Absent any violation, a monitoring function transmits a Safe to Proceed (STP) code to all vehicles in the system. Upon receipt of this code, all vehicles withhold emergency braking for a predetermined amount of time (e.g. 1100 ms). When a violation is detected, the monitoring function removes the STP code from the trailing vehicle (in the case of the merge, the vehicle further away from the merge point) and the vehicle is brought to a stop. An example messaging methodology that implements this monitoring and control function is described in more detail in co-pending application Ser. No. 13/316,402, the contents of which are incorporated herein by reference in their entirety.

In general, there are two safety critical situations for which protection is provided in one example implementation of CAS 1. One is the situation when the motion control function, which is separate from the collision avoidance system such as that provided in the present invention (e.g. the control methodology described in co-pending application Ser. No. 13/323,768), has failed to control cars in a way that maintains a safe separation distance between two successive cars. This failure could have resulted from any or all of the following causes: 1. an error in the design of the control algorithms; 2. a failure of the equipment that comprises the control system, or 3. anomalous behavior of the vehicle that causes it to behave in a way not anticipated by the control system.

The second safety critical situation that requires a response by CAS 1 in one example implementation, is the failure of the equipment whereby the ability to communicate control signals to the vehicle is lost. In such situations, the proper response of CAS 1 is to invoke emergency braking of all cars to which communication has been lost. Furthermore, the last location detected for all vehicles to which communication has been lost must be maintained and considered to be an obstacle to all following vehicles.

Therefore a collision prevention method and system according to embodiments of the invention reacts to control system failures by implementing logic that: 1. detects and responds to motion control failures and 2. detects and responds to hardware failures that disrupt communication.

Figure 2:
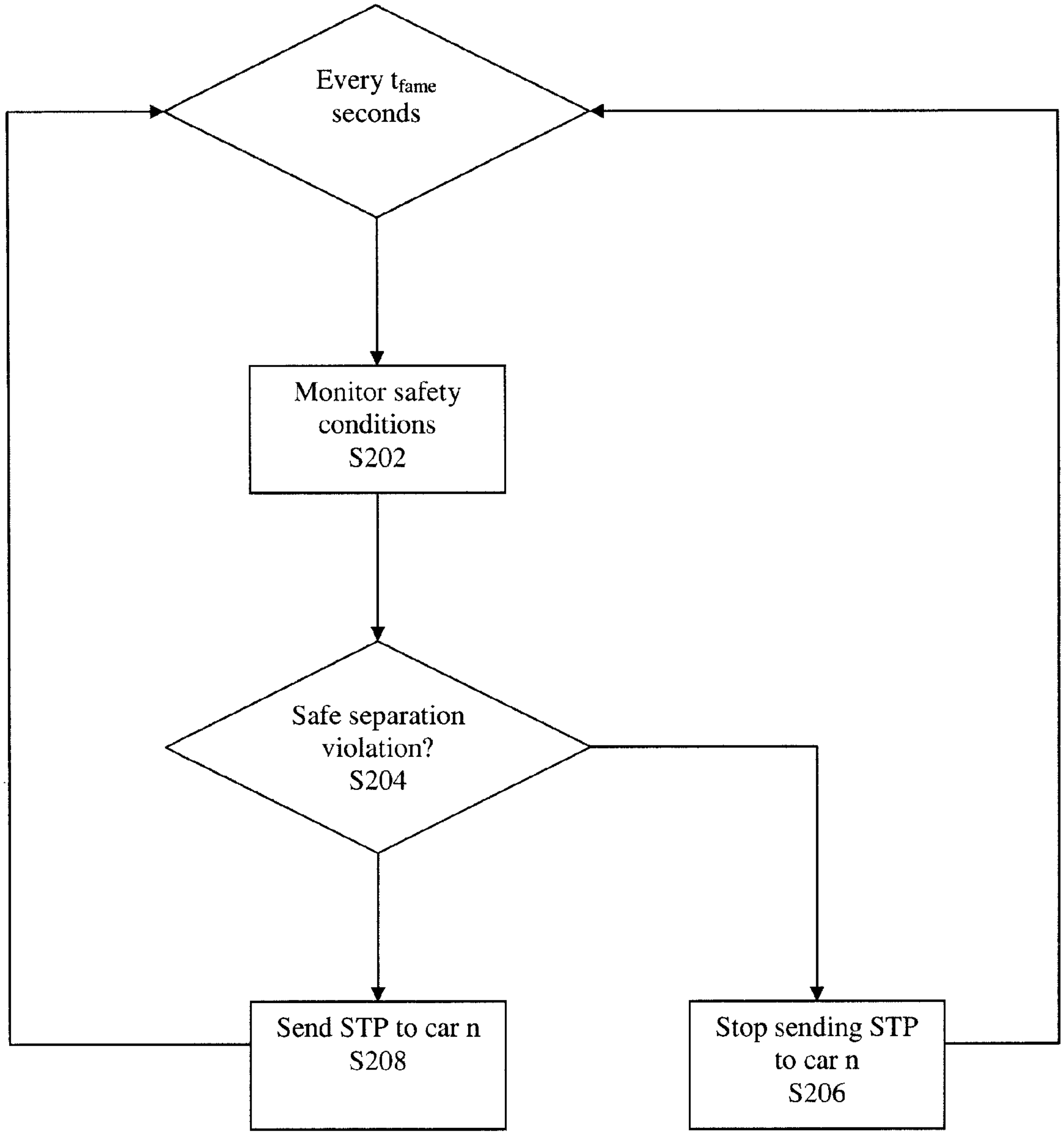
FIG. 2 is a flowchart illustrating an example method according to embodiments of the invention.

For example, as shown in FIG. 2, an example method according to embodiments of the invention include a step of monitoring safety conditions that could possibly cause any of the vehicles on the track to collide in step S202. In embodiments, the process starting with 5202 repeats every $t_{frame}$ seconds (frame time) and is performed for every car (e.g. car "n" in the discussion herein) in the system being controlled and protected. For one example implementation of the invention, $t_{frame}$=500 ms but $t_{frame}$ can be selected to be other times and can be dependent in large measure on the communication technology used.

In step S202 the invention determines if any car is potentially an obstacle to car n. For this discussion, this car is referred to as car "n+1." This could be a car in front of car n on the same track, a car on a adjacent track merging with the track on which car n is on, or a car on a diverging track segment at a location where it is possible for car n to strike the car n+1 even if car, n is taking a different route through the point of diverge. In step 204, the invention considers the dynamic state of cars n and n+1 and determines whether the safe separation distance between the two vehicles has been violated. If the answer to this is yes, in step S206 the invention responds by terminating the transmission of a Safe To Proceed (STP) signal to car n. For example, as described in co-pending application Ser. No. 13/316,402, example vehicle equipment is implemented to require a periodic refresh, (i.e. every $t_{refresh}$) of the Safe to Proceed information in order to withhold the activation of emergency braking. If the Safe to Proceed is not received within $t_{refresh}$ of the previous receipt of this information, the vehicle will automatically initiate irrevocable fail operational closed loop emergency braking. (Note: The time, $t_{refresh}$ should be slightly greater than a small multiple of $t_{frame}$ so for an implementation with a $t_{frame}$=500 ms, $t_{refresh}$ might be selected to be $t_{refresh}$=1100 MS)

As depicted in FIG. 2, and as mentioned above, the above process repeats every $t_{frame}$. If no unsafe conditions are detected in step S204, car n will receive a STP every $t_{frame}$ (step S208) which allows it to continue moving. Otherwise, car n will cease receiving a STP (step S206) and will after $t_{refresh}$ begin to brake to avoid colliding with car n+1.

Embodiments of the invention assume the use of a braking subsystem that is assured to achieve a target braking rate plus or minus a control error to a degree of reliability that supports a safety criteria defined as a system MTBH. An example method for achieving such a target braking rate in a system according to embodiments of the invention is described in more detail in co-pending application Ser. No. 13/316,398.

Figure 3:
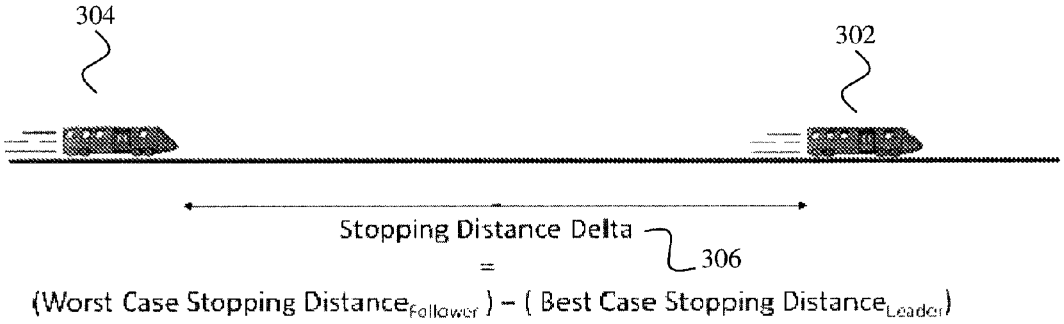
FIGS. 3 and 4 illustrate example methods of determining a safe separation distance according to principles of the invention.

As shown in FIG. 3, and in contrast to conventional signaling systems that assume open loop emergency braking and define the safe separation distance as the worst case stopping distance (WCSD) of the following car, embodiments of the invention define a separation distance that is attempted to be maintained by the control system (i.e. targeted) that includes a distance that is calculated as the delta between the worst case stopping distance of the following car 304 and the best case stopping distance (BCSD) of the leading car 302, i.e. the Braking Distance Delta 306.

| | | |
|---|---|---|
| Safe separation distance | = | $WCSD_{follower} - BCSD_{leader}$ |
| | = | $X_{Braking\ Distance\ Delta}$ |

Figure 4:
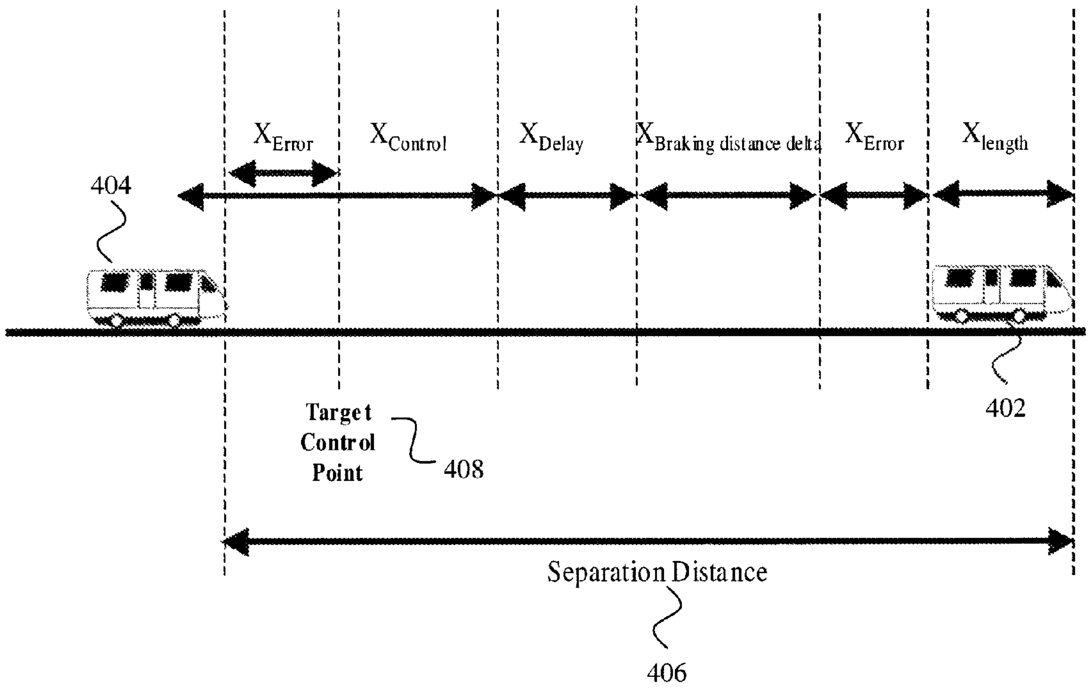

With this definition, the vehicle to vehicle headway distance that is maintained by this example control system is illustrated in FIG. 4, which shows the various distance components that make up the Targeted Headway distance 406. This Targeted Headway Distance is the distance that the control system must attempt to maintain by controlling the trailing car to remain behind the Target Control Point 408 at all times. Note that this distance has included as part of the distance, the anticipated maximum control error that might be expected by the control functions that will attempt to keep the trailing car at or behind the Target Control Point. The Safe Headway Distance, or the distance below which the collision avoidance function must cause emergency braking does not have to include this distance and is therefore the Targeted Headway Distance minus the control error As shown in FIG. 4, in addition to the Braking Distance Delta, the headway computation must also consider the reaction time required for the following vehicle 404 to respond to a need to initiate emergency braking issued by the leading vehicle 402. Since the onset of the need to brake needs to be communicated from the leading vehicle 402 to the following vehicle 404, either directly or indirectly, there is a built in lag in the response of the following vehicle 404 while the communication takes place. The distance that the following vehicle 404 might travel during this delay needs to be included in the Safe Separation Distance between leading vehicle 402 and following vehicle 404 and is represented in FIG. 4 as $X_{Delay}$.

Another distance that is considered is the distance that must be included for the control loop that operates to keep the following vehicle 404 at some desired distance behind the leading vehicle 402. Since the vehicle control loop (e.g. the system and method described in co-pending U.S. application Ser. No. 13/323,768) will attempt to achieve a target movement trajectory, plus or minus a tracking error about the target trajectory, this error is preferably included in the separation distance. The magnitude of this delta, $X_{Control}$, needs to be selected based on the effectiveness of the control loop, and should also be selected to be large enough such that frequent excursions outside of the control band will not occur because each such incident will trigger emergency braking, an operationally undesired event.

Since headway is computed as the time separation between the same point on two vehicles crossing the same point on the guideway, the length of the vehicle is also added to the distance that the following vehicle 404 must travel before it arrives at the same location on the track occupied by the leading vehicle 402 at some earlier time. This is represented in FIG. 4 as $X_{Length}$.

Finally, the control of vehicles requires information regarding the location of the vehicles being controlled. As shown in FIG. 4, the target control point 408 is the sum of all the distances described above from the head of the leading vehicle 402, but does not consider any uncertainty regarding the location of the vehicles 402, 404. The error or position uncertainty associated with each position measurement is therefore an element of the headway computation and is shown in FIG. 4 as $X_{Error}$. Since one must assume that both the leader and follower can be at opposite ends of their uncertainty envelope, twice the measurement error is included in determining the required separation distance 406.

The present inventors further recognize that determination of the difference in the braking distance for the leading and following vehicles 402, 404 is dependent on the underlying assumptions governing the behavior of the vehicles. Since braking distance is closely tied to the brake rates assumed, the degree to which the brake rate of the leading vehicle can be matched to the brake rate of the following vehicle becomes a major driver in this determination.

In addition to the degree to which the brake rates of the leader and follower can be matched, two other considerations are addressed by example embodiments of the control system. They are the behavior of the propulsion motors immediately after emergency braking has been commanded and also the rate at which vehicle acceleration can change to arrive at the emergency brake rate (jerk).

One component in the design of the control system is the assumption regarding the minimum adhesion available from the wheel to rail interface. Although design choices can affect the achievable adhesion to some degree, the coefficient of friction of steel wheels on steel rail, especially when one considers the effects of residue between the two, prevents high levels of adhesion levels from being assumed. Yet, for conventional systems that assume that the lead vehicle can achieve a brick wall stop and to a lesser degree for a hypothetical system that relaxes the brick wall criteria, this characteristic of the wheel to rail interface is a major driver of the achievable headway.

The guaranteed minimum adhesion is generally expressed in terms of the acceleration achievable on flat track in units of miles per hour per second and is a measure of the behavior of the physical interface between the wheels and the running surface. Since it is dependent on the wheel and rail profiles as well as the materials used for each, every operating property typically determines an adhesion level for their wheel and rail design based on field data and analysis of each respective system. Furthermore, on systems that operate both above ground and underground, a different rate may be assumed for the two different types of track. Since this is a minimum guaranteed rate, the analysis assumes that if the braking or propulsion system attempts to brake or accelerate at a rate greater than the minimum guaranteed rate, only the minimum rate can be guaranteed. Higher rates, however, may be achieved under good track conditions.

Rates used for various transit operators in the U.S. is shown in the table below. As shown, the BART system assumes an adhesion rate of 1.5 mphps above ground and 2.0 mphps on covered track. Researchers and developers on this subject have reported that using a variety of techniques, higher adhesions levels have been achieved. One approach uses computer controls to enforce a controlled slip between the wheel and the rail, and has reportedly increased adhesion by as much as 30% to 50% (Burt, H.G.P., "Microprocessor Control of Wheel Slip," ASME/Institute of Electrical and Electronics Engineers (IEEE) Joint Railroad Conference, 1985 and APTA Rail Conference, 1985).

Some systems use special mechanisms that are deployed only during emergency braking to achieve high rates of deceleration. For the headway computations in this discussion, a 1.5 mphps tractive force will be assumed.

TABLE 1

Brake Rates at Different Properties

| Property/Consultant | mphps | Source |
|---|---|---|
| New York Canarsie Line | 1.8 | Parsons |
| Los Angeles Co. MTA | 1.7 | LATC B620, CN070.00, Jul. 28, 1993 |
| MARTA | 1.5 | PBT-TA Received Dec. 15, 1999 |
| Key System | 1.5 | GRS Standards |
| Knorr Brake Corp | 1.5 | Microprocessor Control of Wheel Slip, H. G. P. Burt, 1985 |
| WMATA | 1.35 | 1.8 mphps with 25% brake cutouts, Marty Lukes |
| Penn Central | 1.1 | Below 80 mph Chart SS9505 Apr. 10, 1974 |
| | 1.3 | Above 80 mph |
| | 1.87 | Above 100 mph - Metro Liner |
| Long Island RR | 2.0 | M1 Cars, Jan. 24, 1969 |
| Amtrak Passenger trains | 1.71 | Chart S-603, Aug. 20, 1981 |
| New York Central Passenger Trains | 1.32 | Chart S-2685, Jan. 24, 1956 |
| Bay Area Rapid Transit | 1.5 exposed<br>2.0 covered | |
| SF MUNI emergency brake rate | 2.5 | "Safe Braking of Light Rail Vehicles" by Harry Burt, Booz Allen & Hamilton includes track brakes |
| Average of all properties | 1.66 | |

The present inventors further recognize that the rate at which braking force can be increased to achieve the final required brake rate has an effect on the distance required to stop. The ASCE Standard for Automated People Movers defines the maximum jerk allowed for a system operating with standing passengers as 2.18 mphps. (Automated People Mover Standards/American Society of Civil Engineers, ASCE 21-96). This is the upper limit for a controlled braking scenario and the Standard indicates that higher rates are allowed for situations requiring emergency braking. However, to be conservative, even for the emergency braking scenario, embodiments of the invention assume a maximum of −2.18 mphps for the leading vehicle. For the following vehicle, the assumption will be made that the rate of jerk will be 10% slower (−1.96 mphps) making for a longer stopping distance for the following vehicle.

Figure 5:
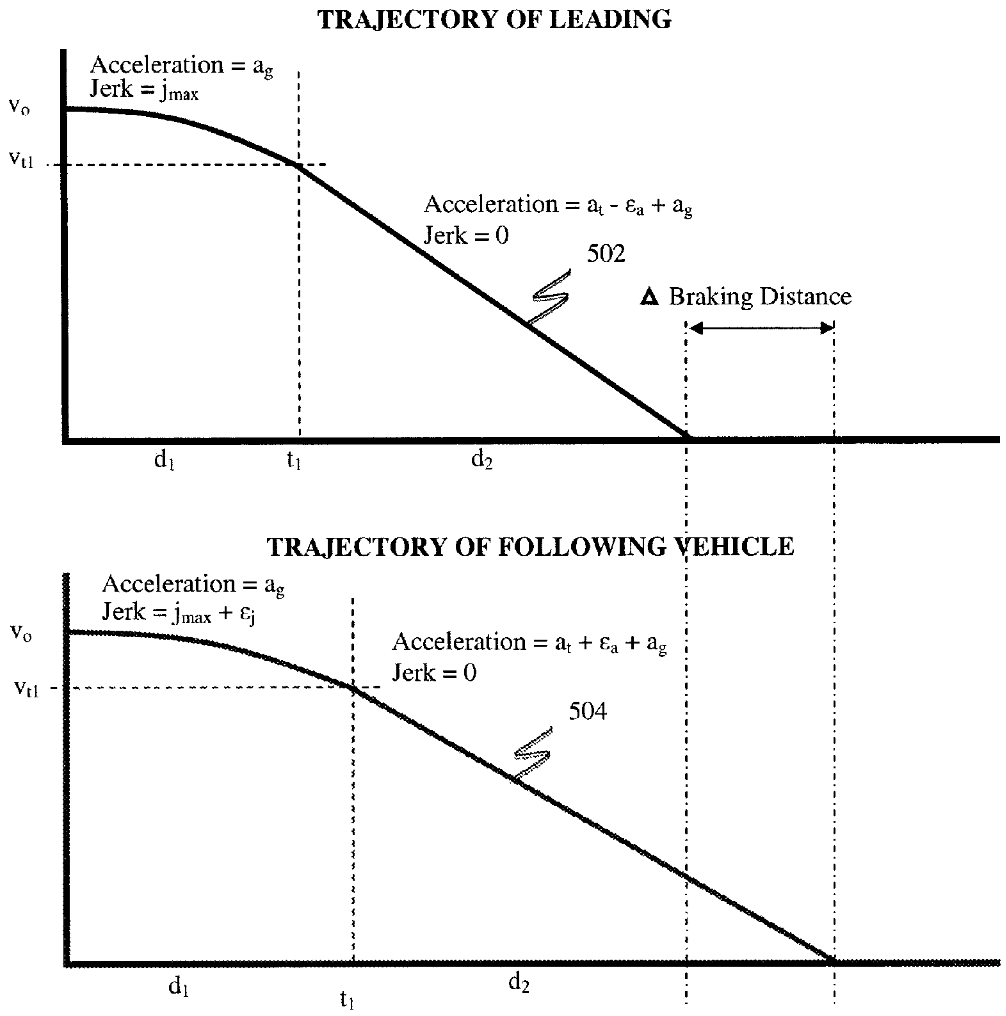
FIG. 5 is a graph that plots the trajectories of leading and following vehicles, illustrating a braking distance delta according to embodiments of the invention.

Since Braking Distance Delta 306 is the difference in the braking distances of the leading and following vehicles, and is an important element of the vehicle to vehicle separation distance 408, the emergency stopping profiles for both vehicles are defined for the vehicles controlled. As discussed earlier, the control system preferably considers both the shortest distance required to stop by the leading car and the longest distance required to stop by the following car. FIG. 5 depicts the trajectories 502 and 504 of both leading and following vehicles, respectively, and illustrates an example basis of the Braking Distance Delta 306 computation.

For the behavior of the braking and propulsion subsystems described in the calculation of the Worst Case and Best Case braking distances described above in connection with FIG. 3, embodiments of the invention use worst case and best case Jerk and Acceleration rates for vehicle trajectories starting at an initial speed and acceleration and braking to a stop as limited by the allowable jerk limit. The acceleration provided by the wheel to rail interface in this computation must be assumed to be maintained about a target rate, $a_t$, to an error margin, $\epsilon_a$, and be augmented by the effects of gravity, $a_g$. The jerk rate applies to the tractive effort from the wheel to rail interface and limits the rate at which the braking force can be increased while achieving the final braking rate. Here, as discussed earlier, a 10% slower rate will be assumed for the following vehicle.

The calculation of the distances $d_1$ and $d_2$ for the leading and following vehicles as shown in FIG. 5 is then simply:

$$d_1=(v_0*t_1+\tfrac{1}{2}*a_g*t_1^2+\tfrac{1}{6}*\text{Jerk}*t_1^3)*1.466\text{ feet}$$

Where $t_1=(a_t+/-\epsilon_a)/\text{Jerk}$ $$d_2=-(v_{t1}^2/2*\text{Acceleration})*1.466\text{ feet}$$

Where $v_{t1}=v_0+a_g*t_1+\tfrac{1}{2}*\text{Jerk}*t_1^2$

The following provides a discussion of how the other distances described above in connection with FIG. 4 can be determined. For example, one of the terms that is preferably included in the vehicle to vehicle separation distance 406 is the distance that the following vehicle 404 will travel after the leading vehicle 402 has initiated its braking sequence before the following vehicle begins its own braking sequence, shown as $X_{Delay}$ in FIG. 4. In keeping with "failsafe" principles, the vehicles should be designed to initiate braking autonomously when commands to withhold braking are lost from either the control equipment along the track or from the leading vehicle. To minimize unnecessary emergency braking events, this delay should be a multiple of at least two or more times the period between updates to withhold emergency brakes. For a vehicle controller developed in the 1980's by the Boeing Aerospace Company, the update rate was 40 ms (E. Nishinaga and C. Colson, "A Vehicle Collision Avoidance System Using Time Multiplexed Hexadecimal FSK," Boeing Aerospace Company, Vehicular Technology Conference, IEEE Vol. 33, 1983) indicating that rather short times can be assumed for this reaction delay time. For example embodiments, a reaction delay of 500 ms will be assumed, which should be reasonably attainable.

Another consideration in the determination of this distance, $X_{Delay}$, is the behavior of the vehicle during this delay period. If the control system controls the vehicle by issuing speed commands to the vehicle which in turn uses onboard sensors to attempt to maintain vehicle speeds at or under the command, then the behavior of the vehicle during this reaction delay time can be assumed to be movement at worst, a constant speed at the speed command. If the control system controls the vehicle by issuing acceleration or tractive effort commands, then under worst case scenarios, one must assume that the vehicle can be accelerating during this reaction delay time at the rate last commanded to the vehicle.

As further discussed above, $X_{Control\ Error}$ is another distance that should be included in the separation distance 406 to allow for some variation in the performance of the non-safety critical control loop that would be needed to keep the vehicle on some desired distance vs. time trajectory behind another leading vehicle. Given that command updates at frequencies in the range of 0.1-0.5 seconds are reasonably achievable, and given that the location of vehicles can be expected to be known to an uncertainty of 10 to 15 feet, control to within 3 to 5 times the position error should be achievable. A value of 50 feet will be used in the calculations performed in these examples.

$X_{Length}$ is simply the length of the vehicle for which the headway is being determined. In example embodiments, for a single 20-passenger vehicle, the vehicle length can be assumed to be 30 feet (1 foot per passenger plus 5 feet on either end.) For a two vehicle consist, the vehicle length is doubled and will be 60 feet.

$X_{Error}$ is a measure of the accuracy to which the position of the vehicle can be determined. There are a variety of means of determining the location of the vehicle, each with different physical phenomena that contribute to the error. Highway automation systems use magnetic markers in the guideway spaced 1 meter apart providing an opportunity to get an absolute position reference approximately once every 3 feet. Radio ranging technology like that used for the Advanced Automatic Train Control (AATC) system developed for SF BART. The AATC system is affected by variations in range measurements resulting from multipath effects of the radio signals. Systems using tachometers to measure distance between guideway markers are subject to errors introduced by slippage of the wheel and must be managed by designing the spacing between the position references so that the buildup of error will never become too large. In any event, control schemes that support high density operation must use techniques that provide vehicle position information to a relatively high resolution. With careful design a position error of 3 feet should be reasonably achievable.

Figure 6:
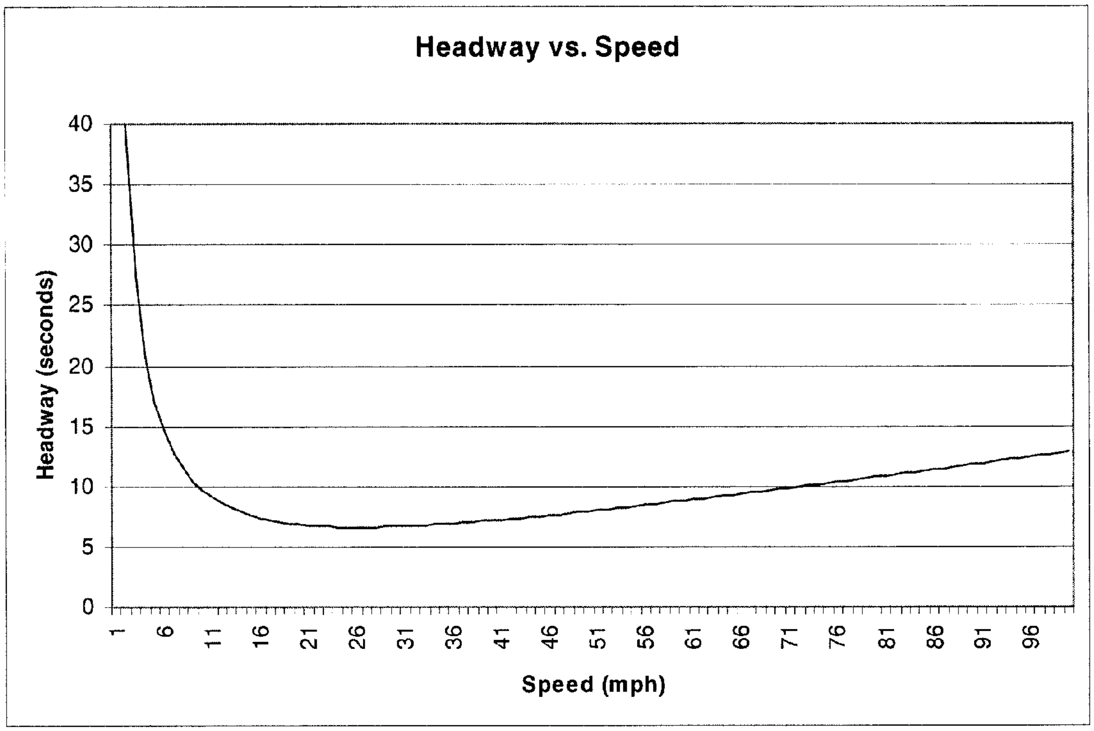
FIG. 6 is a graph illustrating a relationship between headway and speed according to aspects of the invention.

FIG. 6 is an example plot of the achievable headway as a function of vehicle speed assuming a targeted deceleration rate of 1.5 mphps. In this example, the minimum headway is achieved at a speed of about 25 miles per hour making the plot have a positive slope at 60 mph, the speed of primary interest. This means that if 9 seconds can be achieved at 60 mph, then 9 seconds can be achieved at all speeds down to the low point on the plot at around 25 mph.

Performing the computation on a variety of parametric sets, FIG. 6 shows that at 60 mph, a separation headway of about 8.8 seconds can be achieved with the following parametric values:

Parameters Defining Requirement:

| | |
|---|---|
| Max Negative Grade = | −4% |
| Car Length = | 60 feet |

Parameters Representing Design Choices/Goals:

| | |
|---|---|
| Target Acceleration Rate = | −1.5% |
| Brake Control Error = | 3% |
| Reaction Delay for Follower = | 0.5 seconds |
| Acceleration During Delay = | 0 mphps |
| Vehicle Position Uncertainty = | 3 feet |
| Control Error = | 50 feet |
| Jerk (Lead Vehicle) = | −2.18 mphps |
| Jerk (Following Vehicle) = | −1.96 mphps (10% less than for Lead Vehicle) |

Although the ability to achieve a headway of 9 seconds at 60 mph is demonstrated in the example above, the ability to achieve headways even lower than the required 9 seconds increases the flexibility and thus the operability of the system. Thus the effects of varying key parametric values are examined in more detail below.

For example, the present inventors recognize that one factor affecting the parametric values is sensitivity to grade.

Figure 7:
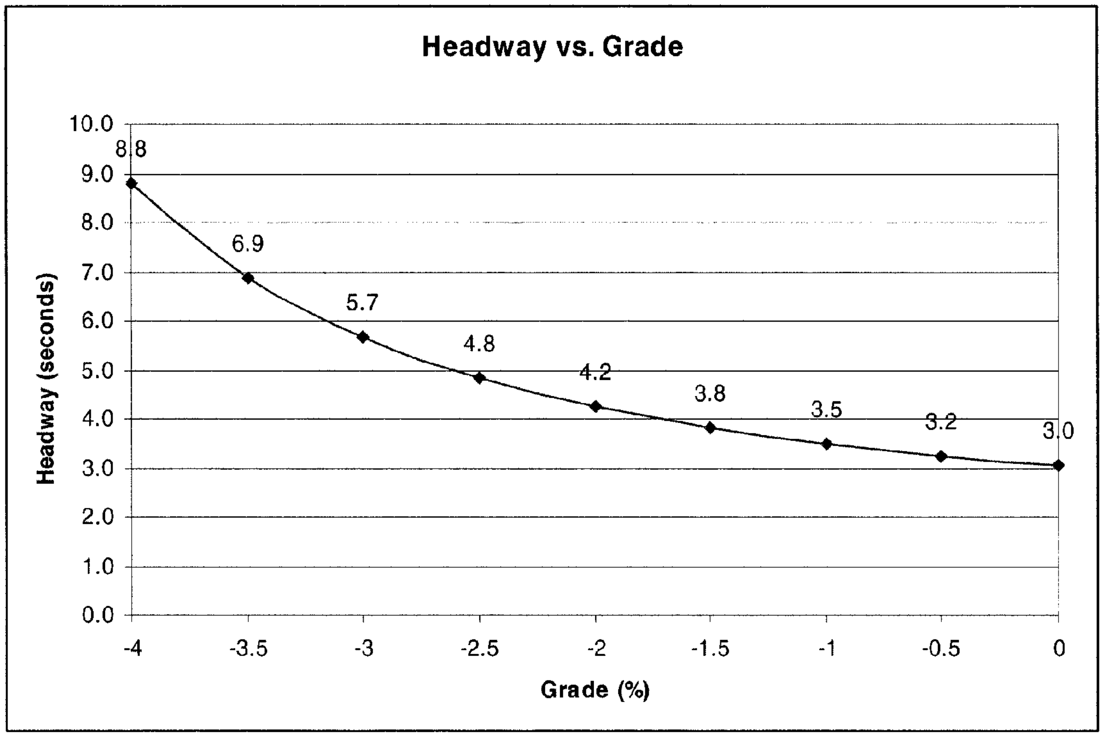
FIG. 7 is a graph illustrating a relationship between grade and headway according to aspects of the invention.

Keeping all parametric values the same as for the calculation performed to produce FIG. 6, but changing the grade of the track, results in the plot of headway at 60 mph versus grade shown in FIG. 7. Here it can be seen that reducing the downgrade reduces the headway by a significant amount. In the planning and construction of a system, the track grades must generally follow the geographical profile of the terrain. However, for short distances, for example on tracks in the vicinity of track switches, one might be able to construct the system such that grades are kept at a more modest grade than −4%. The plot below shows that keeping the grade to −2% can reduce the headway from 8.8 seconds to 4.2 seconds, more than halving the achievable headway. Where merge/diverge maneuvers are required for vehicles on different tracks, this additional cushion could provide considerable flexibility in the operation of the system. For example, the BART system maintains the grade at all station platforms to a maximum limit of +/−1% grade, indicating that constraining the grade at and around switches to 2% might not be all that unreasonable.

As another example, the present inventors recognize that a factor affecting the parametric values is sensitivity to target acceleration (deceleration) rate.

Figure 8:
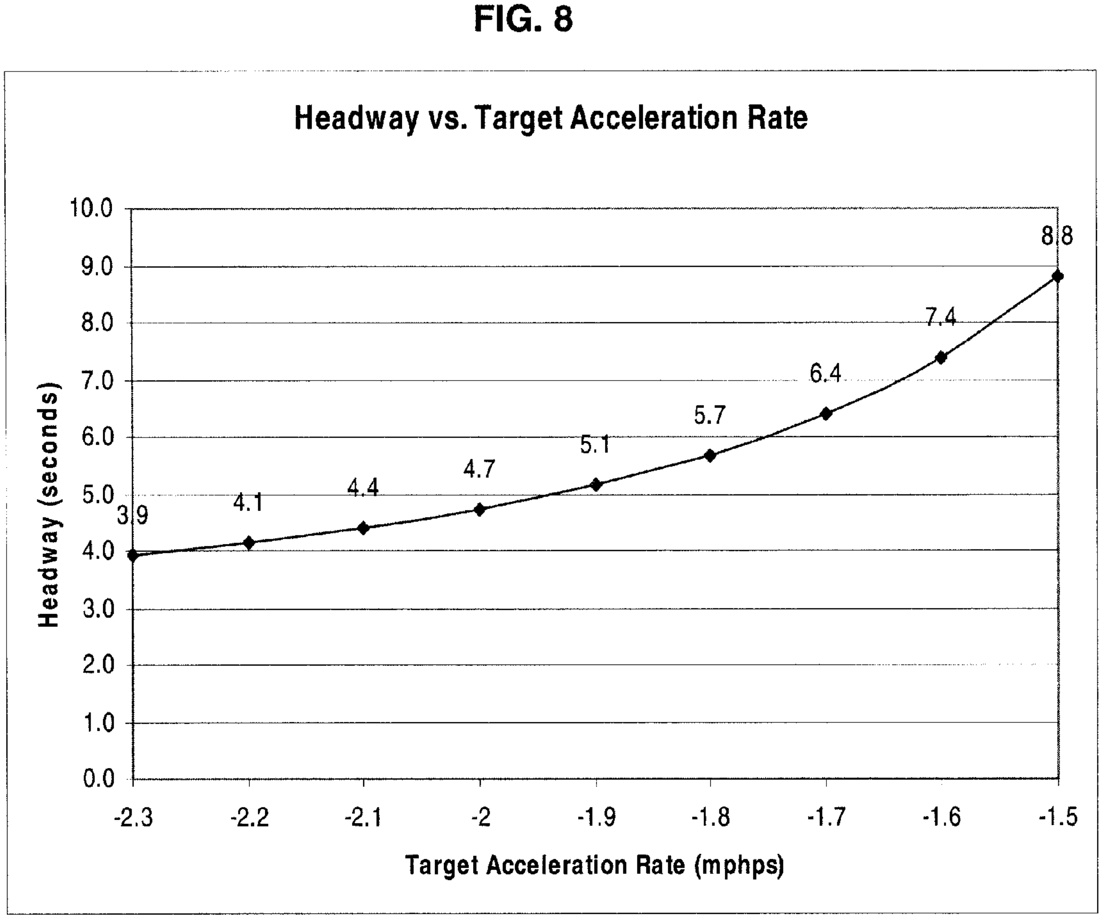
FIG. 8 is a graph illustrating a relationship between target acceleration rate and headway according to aspects of the invention.

In this regard, FIG. 8 illustrates an example of what happens if means can be found to increase the adhesion level between the wheel and the rail. In this plot, the headways calculated are for vehicles on a −4% downgrade but with brake control units on the vehicles programmed to target increasingly higher brake rates (i.e. more negative acceleration). The adhesion levels expressed here as mphps is the dv/dt achievable on flat track for the braking forces created by the braking system. Of particular interest is that increasing the braking force to achieve braking at 2.0 mphps on flat track reduces the headway on a −4% track to 4.7 seconds.

Repeating the computation at 60 mph for different combinations of Grade and Target Brake Rates, the headway matrix of TABLE 2 below is produced and serves as a convenient reference for selecting grades and brake rates for a range of performance levels.

TABLE 2

| Headway Matrix for Highway Automation Control Concept Target Brake Rate | | | | | | | | | | | | | | | | |
|---|---|---|---|---|---|---|---|---|---|---|---|---|---|---|---|---|
| Grade | 1.5 | 1.6 | 1.7 | 1.8 | 1.9 | 2.0 | 2.1 | 2.2 | 2.3 | 2.4 | 2.5 | 2.6 | 2.7 | 2.8 | 2.9 | 3.0 |
| 0 | 3.0 | 3.0 | 2.9 | 2.8 | 2.8 | 2.7 | 2.7 | 2.7 | 2.6 | 2.6 | 2.6 | 2.5 | 2.5 | 2.5 | 2.5 | 2.5 |
| −1 | 3.5 | 3.4 | 3.2 | 3.1 | 3.1 | 3.0 | 2.9 | 2.9 | 2.8 | 2.8 | 2.7 | 2.7 | 2.6 | 2.6 | 2.6 | 2.6 |
| −2 | 4.2 | 4.0 | 3.8 | 3.6 | 3.5 | 3.3 | 3.2 | 3.1 | 3.1 | 3.0 | 2.9 | 2.9 | 2.8 | 2.8 | 2.7 | 2.7 |
| −3 | 5.7 | 5.1 | 4.7 | 4.3 | 4.1 | 3.9 | 3.7 | 3.5 | 3.4 | 3.3 | 3.2 | 3.1 | 3.0 | 3.0 | 2.9 | 2.9 |
| −4 | 8.8 | 7.4 | 6.4 | 5.7 | 5.1 | 4.7 | 4.4 | 4.1 | 3.9 | 3.7 | 3.6 | 3.5 | 3.3 | 3.3 | 3.2 | 3.1 |

As another example, the present inventors recognize that a factor affecting the parametric values is sensitivity to brake control error.

Figure 9:
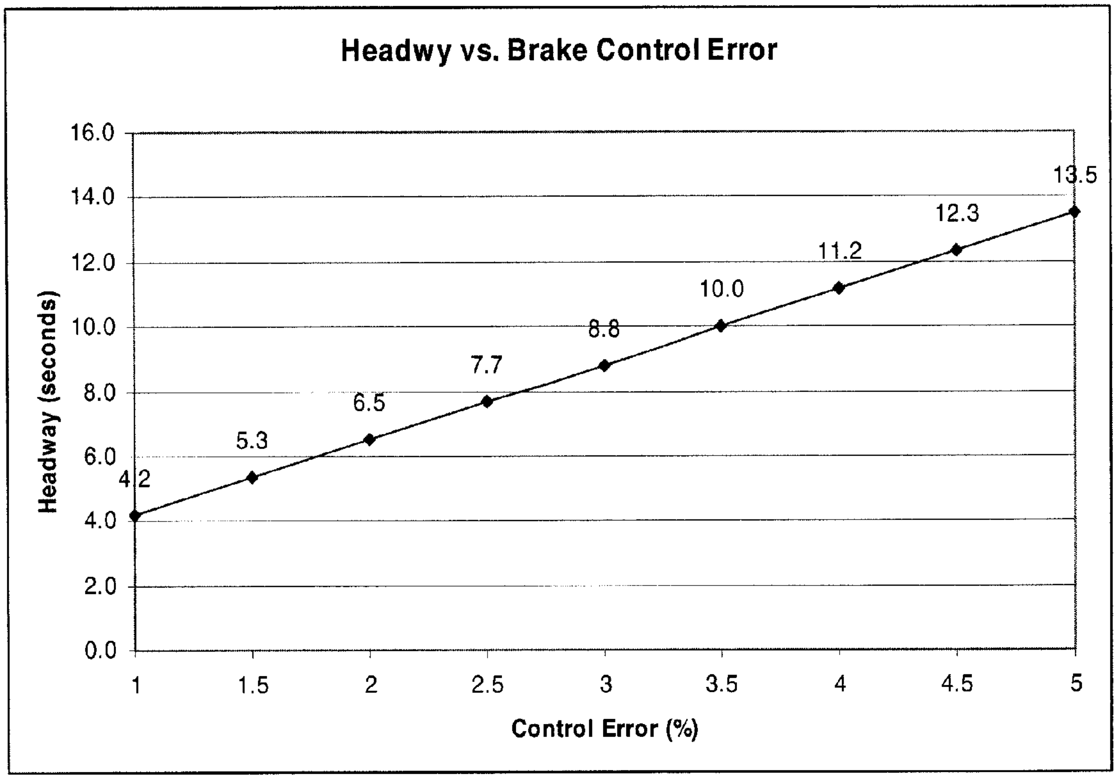
FIG. 9 is a graph illustrating a relationship between brake control error and headway according to aspects of the invention.

FIG. 9 plots the relationship between headways and the "tightness" of the braking control loop. Here again, the headways are calculated for a grade of −4%. The wheel to rail adhesion is also set back to the baseline of 1.5 mphps. Note here that the control error assumed in the baseline calculations assumed a 3% error band which as shown here would be approximately what would be needed if a 9 second headway is to be achieved on a −4% grade.

As yet another example, the present inventors recognize that a factor affecting the parametric values is sensitivity to acceleration during control delay.

In this case, the control loop for the system differs from that assumed for the earlier discussion. Whereas for the cases discussed above, a controller issues speed commands to the vehicle to follow, in this case, the controller issues acceleration commands to control the vehicle. As a result, if communication is lost to the vehicle, until the last received command times out, the vehicle must be considered to continue movement in accordance with its last received command. Therefore, the headway calculation should preferably account for the fact that the propulsion equipment on the following vehicle might be requesting motor current in accordance with the acceleration command during the reaction time of the following vehicle. The forces on the vehicle during this time is the sum of the forces from the motor and gravity and both must be accounted for in the calculation.

Assuming a modest but reasonable maximum acceleration rate for the vehicle of 2 mphps, on a −4% downgrade with the adhesion limited to −1.5 mphps, the achievable headway at 60 mph was computed to be 11.3 seconds. Since this fails to achieve the 9 second criteria the calculation was repeated with increasingly greater adhesion levels. At a rate of −1.65 mphps, a headway of 8.8 seconds was achieved, roughly what was computed for the case where no acceleration takes place during the reaction delay time.

The control algorithm for which headways were computed in this example method did not take into consideration the reported and/or measured acceleration of the lead car. Inclusion of this information is entirely possible and is considered another possible embodiment of the invention. If this is included in the implementation headways can be reduced even further than what has been reported above.

Having now described an example method of determining safe separation distance based on monitored conditions, example methods of reacting to violations according to embodiments will now be described in more detail.

Figure 10A:
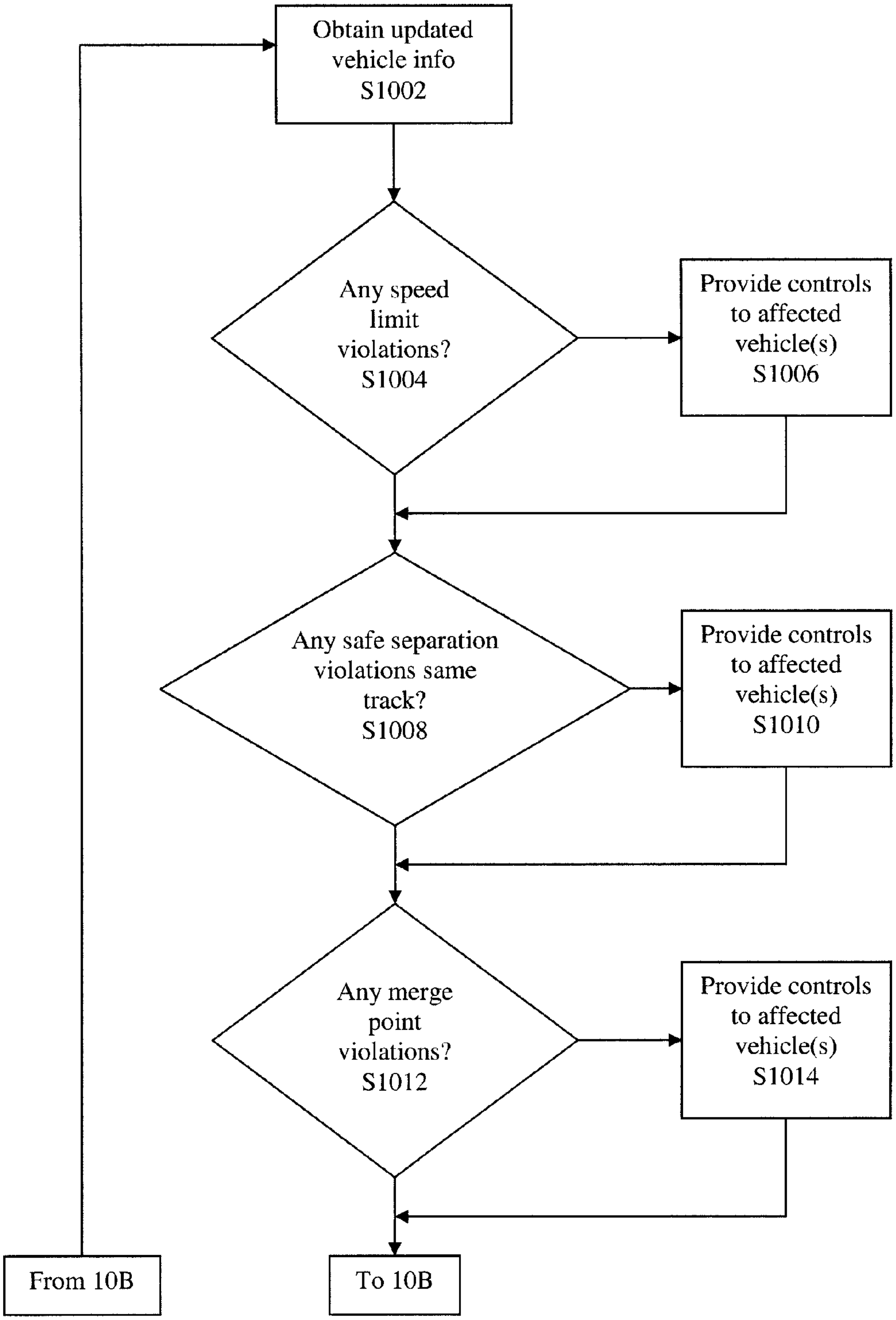
FIGS. 10A and 10B are a flowchart further illustrating an example collision prevention methodology according to embodiments of the invention.
Figure 10B:
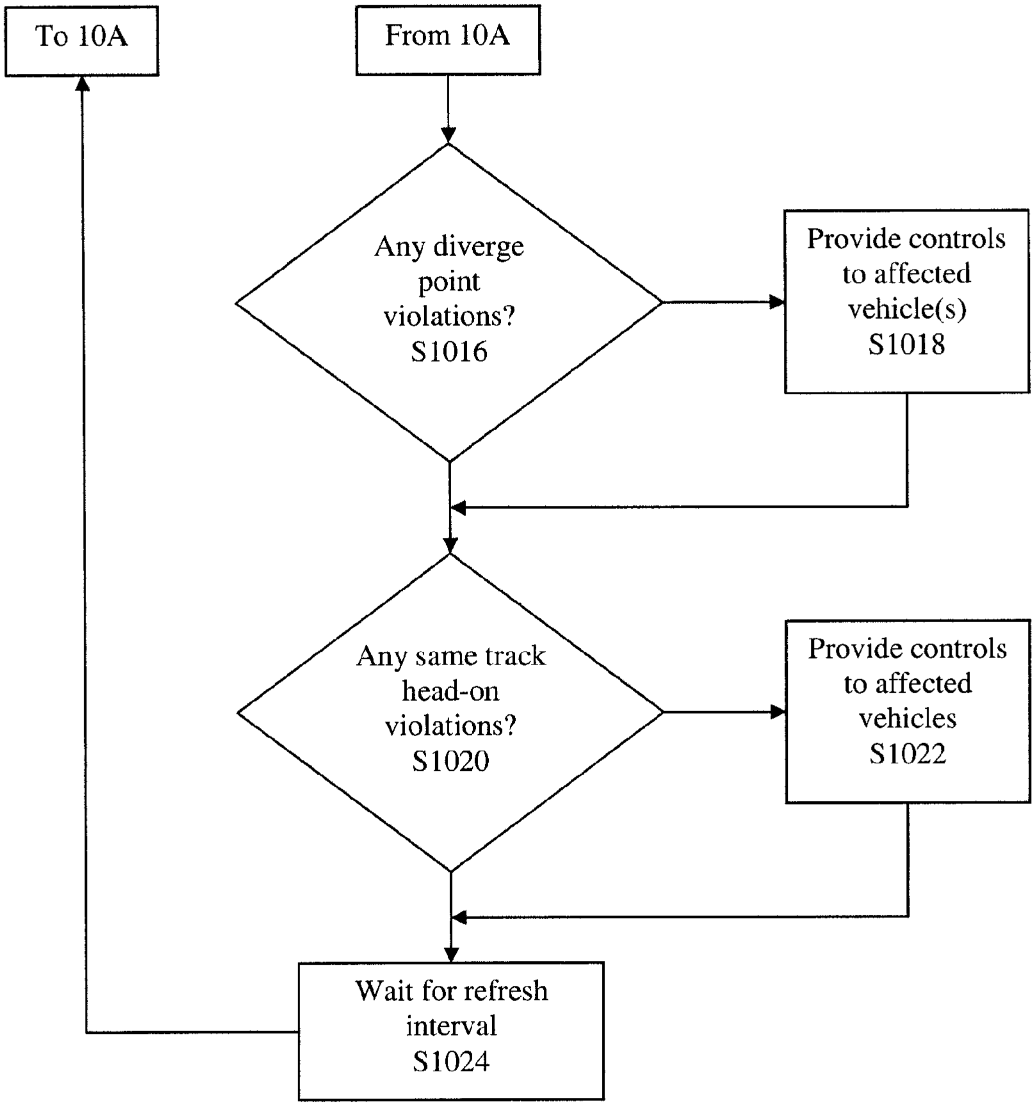

In order to ensure safe responses to failures of motion control functions, embodiments of CAS 1 according to the invention include logic and means to detect and react to potentially unsafe situations in a manner illustrated in the flowchart of FIGS. 10A and 10B.

As shown in FIGS. 10A and 10B, an example method according to the invention includes obtaining updated vehicle information (e.g. position, velocity, acceleration, etc.) at predetermined intervals in step S1002, and determining separation distances between vehicles. As further shown in FIGS. 10A and 10B implement logic that provides protection for various unsafe conditions by both detecting the potentially unsafe system states and then responding in a manner that returns the system to guaranteed safe state in steps S1006, S1010, S1014, S1018 and/or S1022.

As shown in FIG. 10A, one potentially unsafe situation is addressed in steps S1004 and S1006 by detecting and responding to situations when a vehicle can potentially violate the civil speed limit on the track. These steps also preferably include logic and a means of bringing vehicles in a potentially hazardous state to safe stop with a degree of reliability that meets the criteria for safety. (i.e. MTBUF>$10^9$ hours)

For example, when an example implementation of CAS 1 according to the invention detects that a vehicle can either potentially violate a civil speed limit (in other words when the speed limit would be violated if emergency braking is not engaged at that point in time) or has violated a speed limit, the vehicle emergency braking is engaged on the vehicle. This activation of the emergency braking is preferably achieved with a level of reliability such that the system MTBUF safety criteria will not be violated.

In one example method according to the invention, the vehicle is controlled with commands that are sent to the vehicle and refreshed every $t_{frame}$ seconds (e.g. in step S1024 in FIG. 10B). For the control of emergency braking, this command contains a Safe to Proceed (STP) field that is intended and is required for the vehicle to withhold braking. In embodiments, this STP field must be received by the vehicle at least once every $2\times t_{frame}$, and lacking this, the vehicle system is designed to disable the ability to withhold emergency braking. In other words, if the STP is lost for two consecutive periods of $t_{frame}$, the vehicle will unable to withhold emergency braking. In embodiments, $t_{frame}$ is 500 ms and the withholding of emergency braking will be ceased when the STP is not received on the vehicle for 1100 ms.

Given the above, the ability to assure that the STP will not be falsely communicated to the vehicle becomes very important. The system preferably therefore protects against the STP being falsely generated in the station, falsely communicated by the communication medium, or falsely interpreted by the vehicle. This protection is preferably extremely robust and demonstrated to have achieved a reliability that supports the MTBH criteria for the system.

U.S. application Ser. No. 13/316,402 describes an example method that can be implemented to provide this protection according to embodiments of the invention.

Returning to FIG. 10A, an example method includes in steps S1008 and S1010, logic for ensuring that two vehicles traveling in the same direction on a common track will never experience a rear end collision. To prevent rear end collisions, embodiments of CAS 1 determine the Safe Headway Distance (see FIG. 4) between each car and the car leading the car, and confirm that the actual separation distance is greater than or equal to the Safe Separation Distance (Safe Separation Distance=Safe Headway Distance minus the length of the leading car). If ever it is detected that the Separation Distance is less than the Safe Separation Distance, CAS 1 takes action to enforce the required separation.

As further shown in FIG. 10A, embodiments of the invention include a method of detecting and responding to unsafe situations when two vehicles arrive at a merge in the track in steps S1012 and S1014. For example, CAS 1 includes logic for ensuring that two vehicles traveling in the same direction on tracks that are merging will never experience a rear end collision or a side to side collision.

To prevent collisions potentially resulting from this situation, CAS 1 preferably determines whether the relative positioning and speed of two cars arriving at a merge point are such that action can be taken to prevent any collision. If ever it is determined that the relative positioning and speed are such that there is a potential for a collision, CAS 1 takes action to prevent the collision.

One aspect of this collision prevention logic includes a method of determining the safe relative positioning between two vehicles arriving at merging track, and is illustrated and described in connection with FIG. 11.

Figure 11:
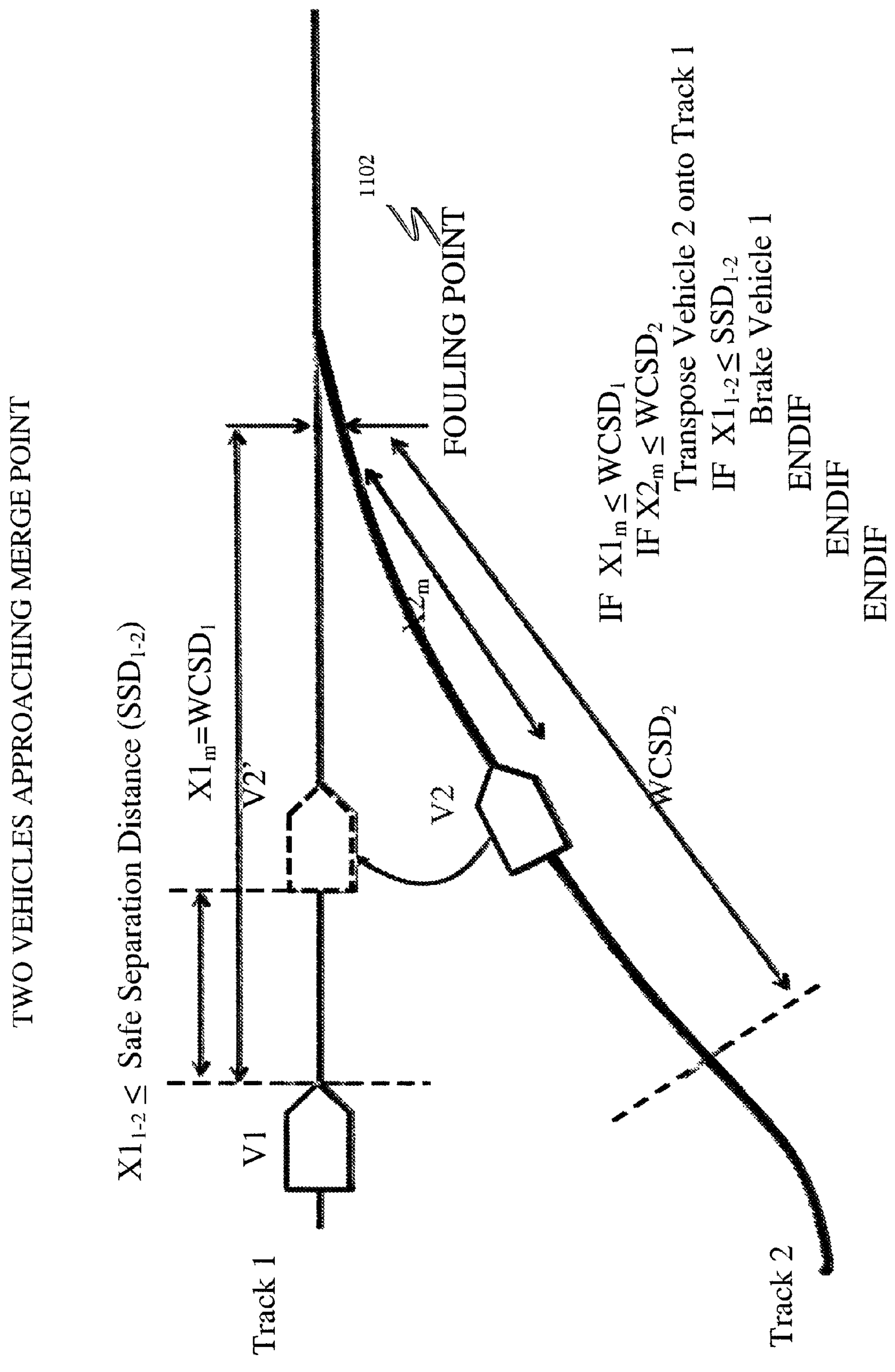
FIG. 11 is a diagram illustrating example methods of preventing collisions between two vehicles approaching a merge point according to embodiments of the invention.

As illustrated in FIG. 11, when a vehicle (e.g. V1) arrives at a point on the track that is one WCSD from the fouling point 1102 for the switch ahead, a check is made to determine if there is any other vehicle on the other track that is at or within one WCSD from the fouling point on the other track. If there is such a vehicle on the other track (e.g. V2), the position of the vehicle on the other track is transposed onto the track with the vehicle looking for conflicts and if the distance between the transposed position and the vehicle (e.g. V2') is less than the safe separation distance, the situation has the potential for a collision and is therefore potentially unsafe.

Accordingly, another aspect of this collision prevention logic includes a response that is preferably taken by CAS 1 when it is determined that the relative positioning and speed of two vehicles arriving at a merge point is potentially unsafe, as described above.

In embodiments, when CAS 1 detects that the Safe Separation Distance has been violated, CAS 1 responds by withholding the safety enable (i.e. Safe To Proceed or STP) information in the transmission from the controller to the vehicle that is the second of the two vehicles arriving at the WCSD distance from the fouling point 1102 of the switch ahead (e.g. V1 in FIG. 11). In example embodiments, the STP is sent every 500 ms as long as unsafe situations have not been detected.

As described in co-pending U.S. application Ser. No. 13/316,402, example vehicle equipment that can be used in the present invention requires a periodic refresh (e.g. at least every 1100 ms) of the Safe to Proceed information in order to withhold the activation of emergency braking. If the Safe to Proceed is not received within 1100 ms of the previous receipt of this information, the vehicle will automatically initiate irrevocable fail operational closed loop emergency braking.

Another aspect of collision prevention logic according to embodiments of the invention includes a method of detecting and responding to unsafe separation between two vehicles at a diverge in the track, as shown in steps S1016 and S1018 in FIG. 10B. For example, embodiments of the invention includes ensuring that two vehicles traveling in the same direction on tracks that will diverge will never experience a rear end collision or a side to side collision.

To prevent collisions potentially resulting from this situation, CAS 1 preferably determines whether the relative positioning and speed of two cars traveling through a diverge point are such that action can be taken to prevent any collision. If ever it is determined that the relative positioning and speed are such that there is a potential for a collision, CAS 1 preferably takes action to prevent the collision.

Figure 12:
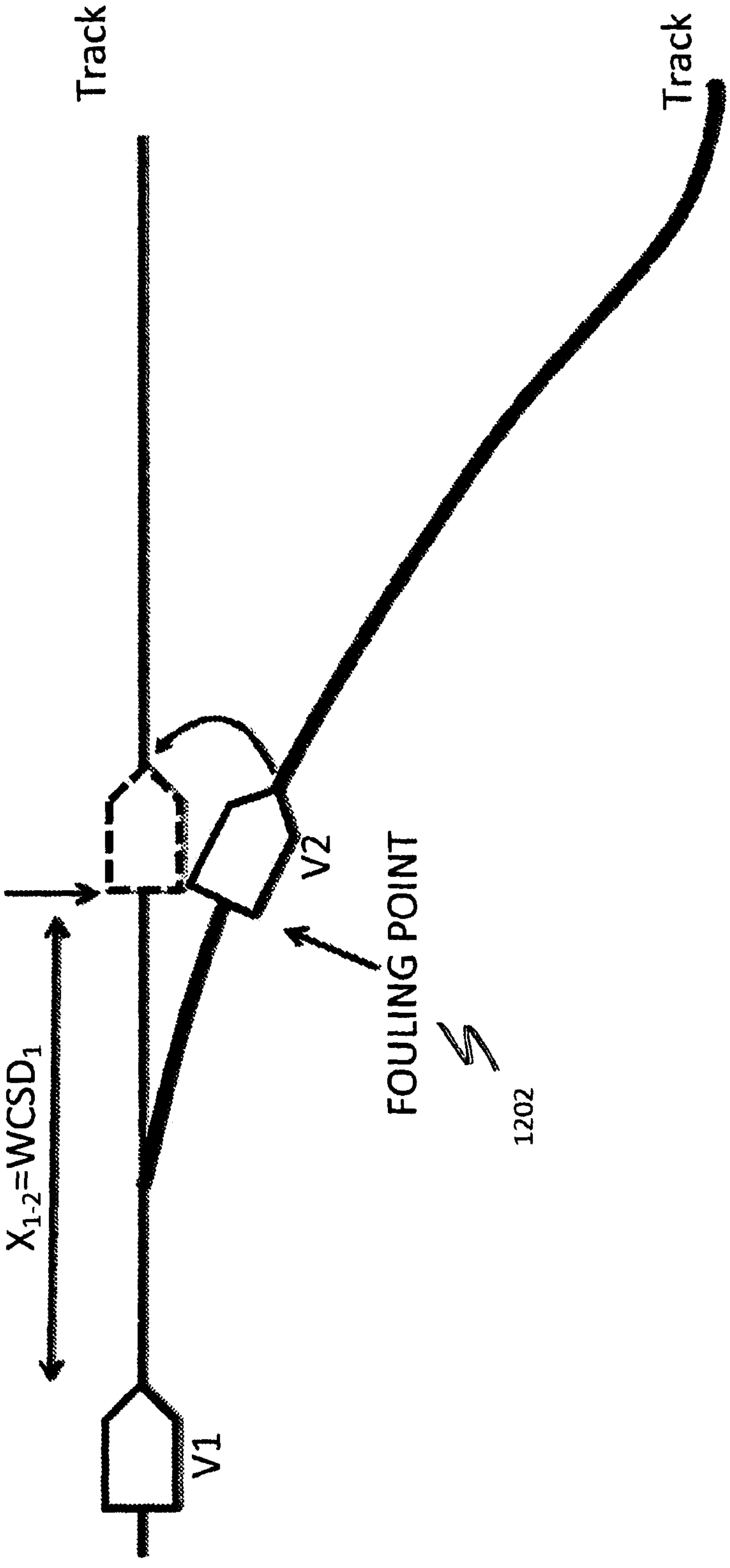
FIG. 12 is a diagram illustrating example methods of preventing collisions between two vehicles approaching a diverge point according to embodiments of the invention.

In this regard, CAS 1 preferably includes logic for determining whether the relative positioning and speed of two vehicles arriving at a diverging point in the track is safe or not is similar to the method for checking for an unsafe separation between two vehicles traveling on the same track as described above. In fact, if the two vehicles are both traveling through the switch onto the same track, there is no difference. However, in the case when one vehicle is taking a path through the switch that is different from the path taken by the other vehicle as shown in FIG. 12, until the leading vehicle (e.g. V2) progresses beyond the fouling point 1202 beyond the point of switch, its position must be transposed as a virtual vehicle (e.g. V2') onto the track to be taken by the trailing vehicle (e.g. V1). The distance between the trailing vehicle and the virtual vehicle must be greater than the safe separation distance for the two vehicles in order to be considered safe.

In the event CAS 1 detects that the Safe Separation Distance has been violated in this situation, CAS 1 responds by withholding the safety enable (Safe To Proceed) information in the transmission from the controller to the trailing vehicle (e.g. V1 in FIG. 12). In embodiments, this information is sent every 500 ms as long unsafe situations have not been detected (step S1024 in FIG. 10B).

As described in co-pending application Ser. No. 13/316,402, example vehicle equipment that can be used in the present invention requires a periodic refresh (e.g. at least every 1100 ms) of the Safe to Proceed information in order to withhold the activation of emergency braking. If the Safe to Proceed is not received within 1100 ms of the previous receipt of this information, the vehicle (e.g. V1 in FIG. 12) will automatically initiate irrevocable fail operational closed loop emergency braking.

Another aspect of collision prevention logic according to embodiments of the invention includes method of detecting and responding to two vehicles traveling toward each other on the same track, as shown in steps S1020 and S1022 of FIG. 10B. For example, embodiments of the invention include a method for ensuring that two vehicles traveling toward each other on the same track will never experience a collision.

In this regard, to prevent collisions potentially resulting from this situation, CAS 1 preferably determines whether the relative positioning and speed of two cars traveling toward each other are such that action can be taken to prevent any collision. If ever it is determined that the relative positioning and speed are such that there is a potential for a collision, CAS 1 preferably takes action to prevent the collision.

Figure 13:
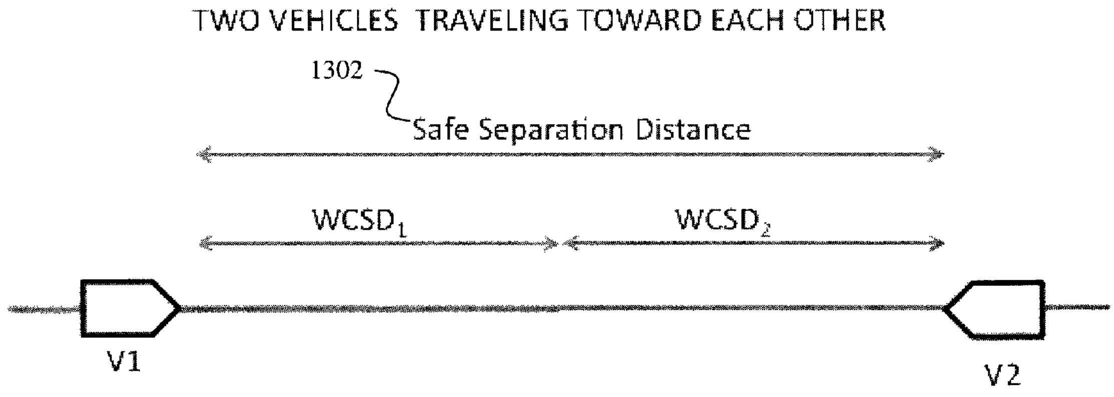
FIG. 13 is a diagram illustrating example methods of preventing collisions between two vehicles traveling toward each other according to embodiments of the invention.

One example method for determining whether the relative positioning and speed of two vehicles traveling toward each other on the same track is safe is illustrated in FIG. 13 and is as follows: 1. Calculate the Worst Case Stopping Distances for the two vehicles traveling toward each other (e.g. V1 and V2); 2. Sum the Worst Case Stopping Distance for the two vehicles; and 3. The safe separation distance 1302 is the sum the two Worst Case Stopping Distances $WCSD_1$ and $WCSD_2$ for the two vehicles V1 and V2, respectively.

In the event CAS 1 detects that the Safe Separation Distance has been violated such as that described above, CAS 1 preferably responds by withholding the safety enable (Safe To Proceed) information in the transmission from the controller to both of the vehicles traveling toward one another (e.g. V1 and V2 in FIG. 13). In embodiments, this information is sent every 500 ms as long unsafe situations have not been detected.

As described in co-pending application Ser. No. 13/316,402, example vehicle equipment that can be used in the present invention requires a periodic refresh (e.g. at least every 1100 ms) of the Safe to Proceed information in order to withhold the activation of emergency braking. If the Safe to Proceed is not received within 1100 ms of the previous receipt of this information, the vehicle (e.g. V1 and V2 in FIG. 13) will automatically initiate irrevocable fail operational closed loop emergency braking.

As shown and described above in connection with FIG. 2, another aspect of collision prevention logic according to embodiments of the invention includes method of detecting and responding to hardware failures that disrupt communications. For example, embodiments of the invention ensure that upon failure to communicate, both the leading and the trailing vehicle will be made to brake. Braking the leading vehicle without braking the following vehicle is, of course, extremely unsafe so care is preferably taken to ensure that it is never possible for this to occur.

One example basic "mechanism" that ensures that leading and trailing vehicles will always brake together is illustrated in connection with FIG. 14, and further details of an example methodology from which this mechanism can be implemented are described in co-pending application Ser. No. 13/316,402.

Figure 14:
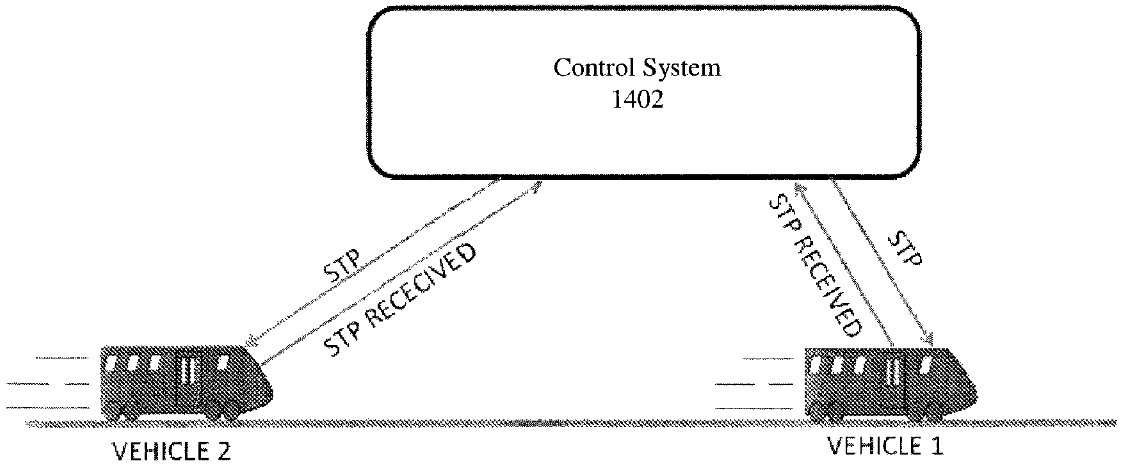
FIG. 14 is a block diagram illustrating an example mechanism for controlling vehicles so as to prevent collisions according to embodiments of the invention.

As shown in FIG. 14, one method of assuring vehicles brake as required to ensure collision prevention is as follows:

1. Design the vehicle borne controller to require the STP indication at least every other frame (Frame=500 ms in one example embodiment) to withhold emergency braking. If the STP is missed for a period greater than 1100 ms, the vehicle borne controller will cease withholding emergency braking and the vehicle will initiate emergency braking.

2. Also design the vehicle borne controller to respond back to the station with an "STP RECEIVED" report every 500 ms.

3. Design the Control System 1402 to send an STP to a vehicle only if it has received an STP RECEIVED report from the vehicle traveling in front of the vehicle. Since this is implemented in the vital computer in the control system 1402, it is assured that processor error will not result in a anomalous transmission of the STP to a trailing vehicle.

With the above implementation, if communication is lost to both Vehicles 1 and 2 shown in FIG. 14, both will initiate emergency braking and will both brake to a stop: Since the two vehicles will have been separated by at least the safe separation distance, and the two vehicles will brake to a stop at nearly the same rate and will not come into contact with each other. If communication is lost to only the leading vehicle the leading vehicle will emergency brake because it has lost the STP, but the following vehicle will also be made to brake because, the STP RECEIVED report from the leading car will be lost by the control system 1402 which will cause it to withhold the STP from the trailing vehicle as well. Again with both vehicles braking at nearly the same rate, the two vehicles will not come into contact with each other. In the event communication is lost to only the trailing vehicle, only the trailing vehicle will emergency brake which is safe.

Figure 15:
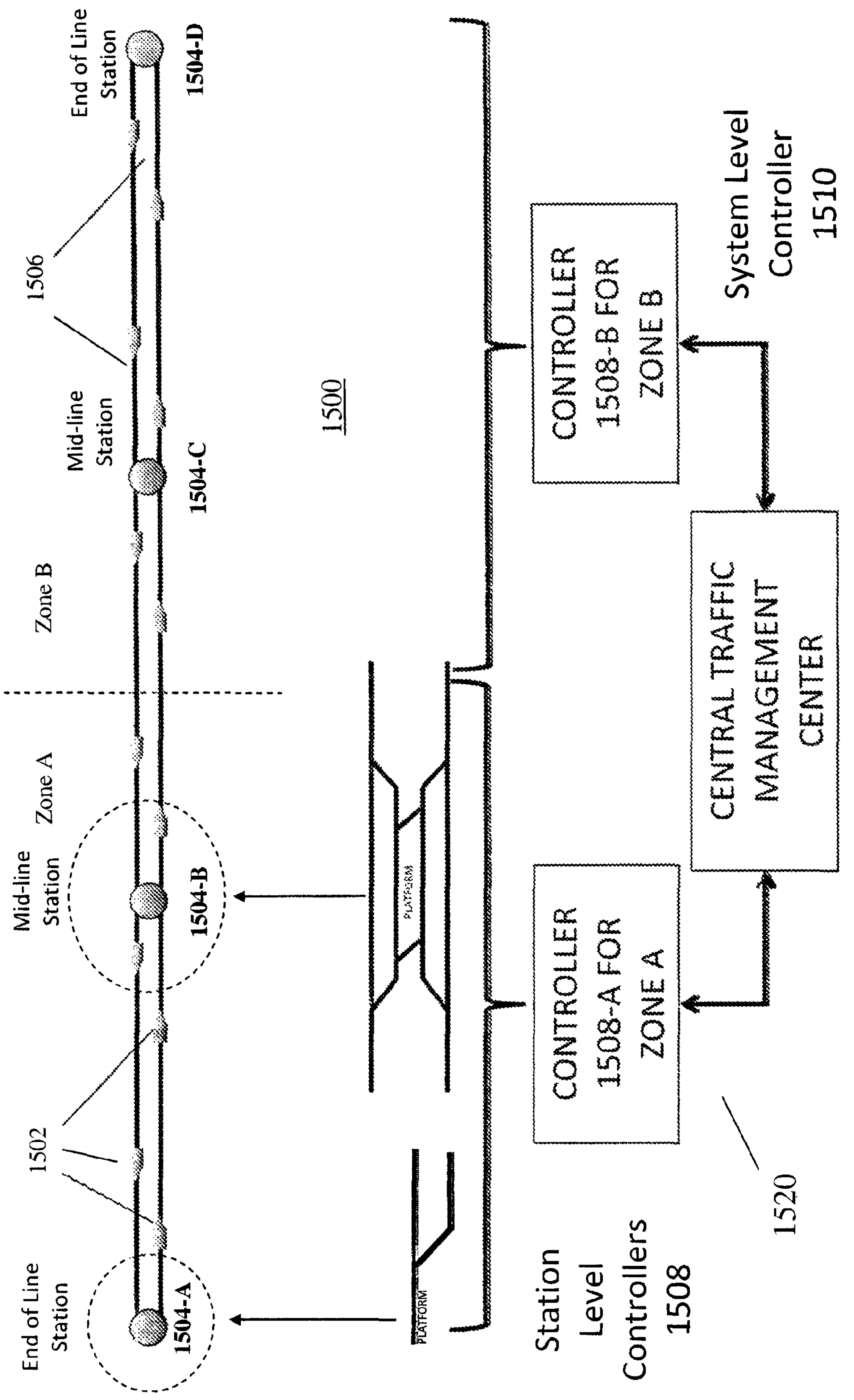
FIG. 15 is a block diagram illustrating an example transportation system implementing a collision avoidance system according to embodiments of the invention.

FIG. 15 is a diagram illustrating an example fixed guideway transportation system 1500 implementing a collision prevention methodology according to embodiments of the present invention. As shown, the system 1500 includes stations 1504 and track 1506. Vehicles 1502 run on track 1506 and collisions between them are prevented (e.g. safe separation distances between them are maintained) by control system 1520.

Embodiments of the invention implement a fixed guideway transportation system 1500 that result from the method for designing a system according to the invention described in co-pending application Ser. No. 13/218,422. For example, system 1500 uses grade-separated track at mode crossings, includes station platforms where stopped vehicles will not obstruct traffic flow, provides a cost effective way of controlling operation of the system (e.g. driverless cars with lower cost controllers), safely achieves traffic densities for the system that are greater than that achievable with current train control systems, configures the size of cars for the system that achieve an improved amount of benefits per cost with a lower net current cost. Moreover, although the principles of the inventions of the co-pending application and the present application are explained in connection with implementations using conventional diesel and/or electrified steel wheel on steel rail systems, the invention is not limited to these types of systems. For example, the principles of the invention can be extended to any other transportation systems that operate vehicles on trackways that are separated from pedestrians and all other types of vehicles such as vehicles that operate with rubber tires on pavement (or otherwise without rails), vehicles that operate with non-steel wheels on rails, vehicles that utilize magnetic levitation and/or propulsion, vehicles that utilized pneumatic levitation and/or propulsion.

Although shown as a straight linear line in FIG. 15, this example is not limiting, and track 1506 may comprise a more complex route including various merge points and diverge points. It should also be noted that, where service lines from two or more service corridors come together, interchanges similar to those with conventional freeway interchanges are possible.

In accordance with the high-density control principles of the present invention, all fixed obstacles have been eliminated from vehicles 1502 running on track 1506. Accordingly, stations 1504 are off-line, for example using mid-line and/or end-of-line platforms such as those described in co-pending application Ser. No. 13/218,422. Moreover, collision prevention system 1520 implements communication based train control such as that described in co-pending application Ser. No. 13/316,402. Further, vehicles 1502 include vehicle-based switching mechanisms such as those described in co-pending application Ser. No. 13/323,759. Moreover, vehicles 1502 preferably include targeted brake rate functionality such as that described in co-pending application Ser. No. 13/316,398.

Generally, collision prevention system 1520 comprises one or more computers that implement embodiments of the collision prevention methodology described herein, as well as other vehicle control functions described in the co-pending applications. In the example shown in FIG. 15, the system is divided into two zones, Zone A and Zone B with a separate controller 1508 having jurisdiction over each zone. Note that the number of zones comprising a system is not limited to two but can be any number as required for the service area. Second note that a Central Traffic Management Center 1510 is needed which interfaces with each of the Zone Controllers 1508 and monitors and manages traffic by accepting reports from each Zone Controller and issuing vehicle movement requests to each Zone Controller. A large system need not be limited to a single Traffic Management Center and can in fact include multiple centers all connected together and sharing traffic information from the other centers.

In embodiments, system 1500 preferably employs an overall collision prevention scheme described in more detail in co-pending application Ser. No. 13/218,429, and may further include vehicle control functionality such as that described in co-pending application Ser. No. 13/323,768. Furthermore, system 1500 includes control systems that are implemented in accordance with the reduced-cost aspects described in more detail in co-pending application Ser. No. 13/218,423.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method of controlling a plurality of driverless vehicles in a fixed guideway system, comprising:

identifying a controlled braking rate for each of the plurality of vehicles, the controlled braking rate including best and worst case jerk and acceleration rates for emergency braking;

periodically determining whether there are any safety violations in the system, the determination taking into account the controlled braking rates of the vehicles; and withholding transmission of a safety signal to certain of the vehicles if there is a violation.

2. A method according to claim 1, further comprising:

maintaining separation between certain of the vehicles by calculating a stopping distance delta between a leading vehicle and a trailing vehicle.

3. A method according to claim 2, wherein the stopping distance delta includes a worst case stopping distance of the trailing vehicle and a best case stopping distance of the leading vehicle.

4. A method according to claim 3, further comprising calculating the worst case stopping distance and the best case stopping distance using the controlled braking rate.

5. A method according to claim 2, wherein periodically determining whether there are any safety violations includes continually monitoring the stopping distance delta.

6. A method according to claim 5, wherein continually monitoring the stopping distance delta includes periodically receiving location information from the plurality of vehicles.

7. A method according to claim 6, wherein communication based train control is used to periodically receive the location information from the plurality of vehicles.

8. A method according to claim 1, wherein periodically determining whether there are any safety violations includes maintaining a minimum headway between all vehicles in the system.

9. A method according to claim 1, wherein periodically determining whether there are any safety violations includes determining whether there are one or more of a civil speed limit violation, a safe separation violation between two vehicles traveling in the same direction on the same track, a merge point violation, a diverge point violation, and a safe separation violation between two vehicles traveling in opposite directions on the same track.

10. A system for controlling a plurality of driverless vehicles in a fixed guideway system, comprising:

an interface in each of the vehicles; and a station controller that communicates with the interface in each of the vehicles to control the application of emergency braking in each of the vehicles, the station controller controlling the application of emergency braking in each of the vehicles by:

identifying a controlled braking rate for each of the plurality of vehicles, the controlled braking rate including best and worst case jerk and acceleration rates for emergency braking;

periodically determining whether there are any safety violations in the system, the determination taking into account the controlled braking rates of the vehicles, and withholding transmission of a safety signal to certain of the vehicles if there is a violation.

11. A system according to claim 10, wherein the station controller further maintains separation between certain of the vehicles by calculating a stopping distance delta between a leading vehicle and a trailing vehicle.

12. A system according to claim 11, wherein the stopping distance delta includes a worst case stopping distance of the trailing vehicle and a best case stopping distance of the leading vehicle.

13. A system according to claim 12, wherein the station controller further calculates the worst case stopping distance and the best case stopping distance using the controlled braking rate.

14. A system according to claim 11, wherein the station controller periodically determines any safety violations by continually monitoring the stopping distance delta.

15. A system according to claim 14, wherein continually monitoring the stopping distance delta includes periodically receiving location information from the plurality of vehicles.

16. A system according to claim 15, wherein communication based train control is used to periodically receive the location information from the plurality of vehicles.

17. A system according to claim 10, wherein the station controller periodically determines safety violations by maintaining a minimum headway between all vehicles in the system.

18. A system according to claim 10, wherein safety violations include one or more of a civil speed limit violation, a safe separation violation between two vehicles traveling in the same direction on the same track, a merge point violation, a diverge point violation, and a safe separation violation between two vehicles traveling in opposite directions on the same track.

19. A system according to claim 10, further comprising:

a transmitter in the station controller that transmits a safety enable signal to the vehicles if the station controller does not detect any safety violations, wherein the station controller withholds transmission of the safety enable signal to the certain vehicles.

20. A system according to claim 13, further comprising:

a receiver in the station controller that periodically receives location information from the plurality of vehicles.

21. A system according to claim 20, wherein communication based train control is used to periodically receive the location information from the plurality of vehicles.

* * * * *